United States Patent
Almgren et al.

(10) Patent No.: US 8,787,825 B2
(45) Date of Patent: Jul. 22, 2014

(54) METHOD AND APPARATUS FOR CONTROLLING THE ACTIVATION OF AN AMPLIFIER ARRANGEMENT IN A REPEATER DEVICE DISPOSED IN A RADIO COMMUNICATION SYSTEM

(75) Inventors: Magnus Almgren, Sollentuna (SE); Per Skillermark, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 670 days.

(21) Appl. No.: 12/747,767

(22) PCT Filed: Dec. 14, 2007

(86) PCT No.: PCT/EP2007/063941
§ 371 (c)(1),
(2), (4) Date: Jun. 11, 2010

(87) PCT Pub. No.: WO2009/076994
PCT Pub. Date: Jun. 25, 2009

(65) Prior Publication Data
US 2010/0273415 A1  Oct. 28, 2010

(51) Int. Cl.
*H04B 3/36* (2006.01)
*H04B 7/155* (2006.01)
*H04W 16/26* (2009.01)

(52) U.S. Cl.
CPC ........... *H04B 7/15535* (2013.01); *H04W 16/26* (2013.01); *H04B 7/15514* (2013.01)
USPC ................................................ 455/9; 455/15

(58) Field of Classification Search
None
See application file for complete search history.

(56) References Cited

U.S. PATENT DOCUMENTS

| | | | |
|---|---|---|---|
| 4,713,809 A | 12/1987 | Mizota | |
| 5,010,583 A * | 4/1991 | Parken | 455/9 |
| 5,200,955 A | 4/1993 | McFarlane et al. | |
| 5,448,623 A * | 9/1995 | Wiedeman et al. | 455/13.1 X |
| 5,479,443 A * | 12/1995 | Kagami et al. | 455/13.1 X |
| 7,062,224 B2 | 6/2006 | Baker et al. | |
| 7,149,526 B2 * | 12/2006 | Karabinis et al. | 455/12.1 X |
| 7,236,470 B1 | 6/2007 | Bims | |
| 7,929,988 B2 * | 4/2011 | Horiuchi et al. | 455/11.1 |
| 2004/0224631 A1 | 11/2004 | Davis et al. | |
| 2006/0166618 A1 | 7/2006 | Bakaimis | |
| 2006/0193280 A1 | 8/2006 | Lee et al. | |
| 2007/0015462 A1 | 1/2007 | Dean et al. | |

FOREIGN PATENT DOCUMENTS

| | | |
|---|---|---|
| DE | 19635148 A1 | 3/1998 |
| EP | 0274857 A1 | 7/1998 |
| GB | 2316578 A | 2/1998 |

* cited by examiner

*Primary Examiner* — Philip Sobutka
(74) *Attorney, Agent, or Firm* — Coats & Bennett, PLLC

(57) ABSTRACT

A repeater device (R) for use in a radio communication system comprises a detector (44), arranged for detecting any existence of radio signaling to and/or from a user terminal being situated in a vicinity of the repeater device (R). The repeater device (R) further comprises an amplifier arrangement (46), arranged for amplifying uplink and/or downlink traffic and means (48) for activating the amplifier arrangement. The means (48) for activating the amplifier arrangement is arranged for activating the amplifier arrangement (46) as a response to an existence of the radio signaling. A method for controlling operation of a repeater in radio communication system comprises detecting, in the repeater, of radio signaling to and/or from a user terminal being situated in a vicinity of the repeater. Amplification in the repeater is activated as a response to an existence of the radio signaling and uplink and/or downlink traffic is amplified.

14 Claims, 5 Drawing Sheets

METHOD AND APPARATUS FOR CONTROLLING THE ACTIVATION OF AN AMPLIFIER ARRANGEMENT IN A REPEATER DEVICE DISPOSED IN A RADIO COMMUNICATION SYSTEM

TECHNICAL FIELD

The present invention relates in general to wireless radio communication and in particular to repeaters used in wireless radio communication systems.

BACKGROUND

Radio repeaters are used to enhance coverage and capacity of radio networks. In the downlink a radio repeater receives the signal transmitted from the base station, amplifies it and transmits the amplified signal such that it may be received by the terminal. In the uplink the repeater works in the opposite way.

A radio relay is a unit capable of decoding incoming signals and encoding the decoded signals into new signals to be forwarded. The complexity allows typically for reduction of noise and if necessary change of applied modulation and coding. Typically, a relay introduces a certain time delay. A repeater is a simpler piece of equipment that essentially without time delay amplifies and forwards a radio signal. The modulation and coding format of the transmitted signal is always equal to the originally received signal. An operating relay is typically known by the system and registered to a specific base station, while the existence of a repeater may be totally transparent also during operation.

In the published U.S. patent application US 2006/0166618, an adaptive relay management is disclosed. Usage requirements in a cell are evaluated and the number and/or type of relays used in the cell are varied in order to meet the usage demands. Instructions about the required configuration are broadcasted to the relays for configuring/registering thereof. In this way, the system ensures that enough resources are available to meet the user requirements.

Since the output power of a radio repeater may be relatively low in comparison to the output power of a base station, it may often be needed to deploy multiple radio repeaters in a cell in order to provide high data rate coverage in a large part of the cell area. A specific user terminal, however, may typically only hear one or a few of the radio repeaters. Accordingly, when the base station transmits (unicast) data destined to a particular user terminal it would be enough that the radio repeaters that enhance the reception quality of this particular user terminal are active. Other radio repeaters do not improve the reception quality. On the contrary, these repeaters cause unnecessary interference and their transmission consumes power without making any good. Such unnecessary power consumption is in particular a drawback for battery powered repeaters, which may be the case e.g. for some movable repeaters.

A general problem in prior art use of repeaters is thus that the use of repeaters typically causes unnecessary radio signaling, thereby increasing interference and power consumption.

SUMMARY

In one or more embodiments, the present invention provides radio communication systems using repeaters, in which radio repeaters may be activated depending on the traffic in the cell. A further object of the present invention is to provide systems and repeaters that only activate repeaters being situated relatively close to an active user terminal, i.e., to only activate repeaters that may improve the communication quality of the active user terminal. Yet a further object of the present invention is to provide systems and repeaters that deactivate repeaters being situated far from any active user terminal.

In a first aspect, the present invention provides a method for controlling operation of a repeater in radio communication system comprises detecting, in said repeater, of radio signaling to and/or from a user terminal being situated in a vicinity of the repeater. Amplification in the repeater is activated as a response to an existence of the radio signaling and uplink traffic from the user terminal and/or downlink traffic to the user terminal is amplified.

According to a second aspect, a repeater device for use in a radio communication system comprises a detector, arranged for detecting any existence of radio signaling to and/or from a user terminal being situated in a vicinity of the repeater. The repeater device further comprises an amplifier arrangement, arranged for amplifying uplink and/or downlink traffic and means for activating the amplifier arrangement. The means for activating the amplifier arrangement is connected to the detector and arranged for activating the amplifier arrangement as a response to an existence of the radio signaling. The amplifier arrangement is arranged to amplify uplink traffic from the user terminal and/or to amplify downlink traffic to the user terminal.

A general advantage with the present invention is that unnecessary radio transmitting is reduced in communication systems comprising repeaters and that the total power consumption is reduced. Further advantages of particular embodiments are discussed in connection with respective embodiment.

BRIEF DESCRIPTION OF THE DRAWINGS

The invention, together with further objects and advantages thereof, may best be understood by making reference to the following description taken together with the accompanying drawings, in which.

DETAILED DESCRIPTION

Figure 1:
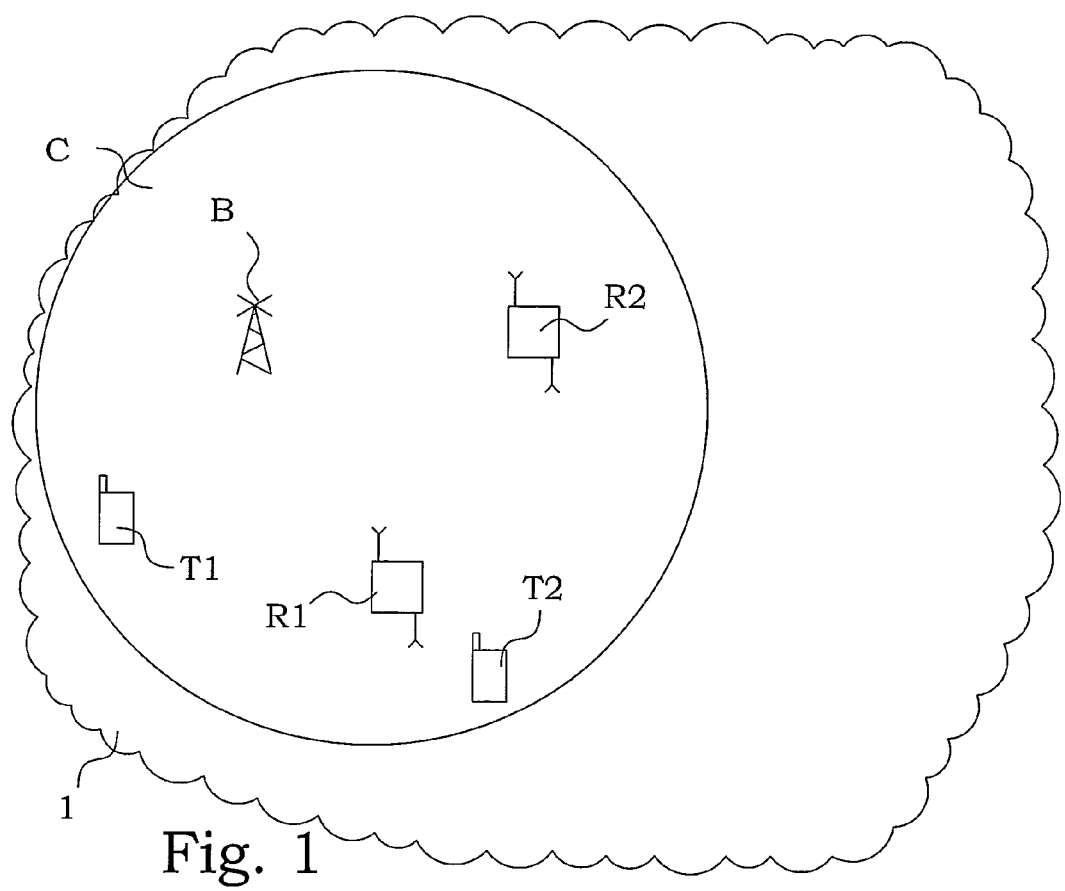
FIG. 1 is a schematic illustration of a use of repeaters in cellular communication systems.

In the drawings, corresponding reference numbers are used for similar or corresponding parts.

The basic scenario of the present invention is schematically illustrated in FIG. 1. The invention proposes a method for selective activation of radio repeaters deployed in a communication system. FIG. 1 depicts a cell C in a cellular mobile communication system 1 associated with a base station B. In the cell C, two radio repeaters R1, R2 are deployed to enhance the performance. In the example in FIG. 1 a user terminal T2 is situated close to the repeater R1 and would hence benefit of repeater R1 being active. A user terminal T1 is not located nearby any repeater node and does not benefit from the activation of any of the repeater nodes. There is neither any user terminal in the vicinity of repeater R2 and hence in this particular situation repeater R2 is of no use.

Accordingly, in FIG. 1 it would be desirable if repeater R1 is active when traffic is transmitted to/from user terminal T2 but silent otherwise. Repeater R2 should, independent of the traffic, be silent such that no unnecessary interference is caused and the power consumption is kept low. Expressed more general, a repeater should be active when there is traffic to or from a terminal being situated so close to the repeater that the repeater improves the signaling conditions. Otherwise, the repeater should be silent.

In a first embodiment of the present invention, activation/deactivation of a repeater is performed without any explicit involvement of any stationary network node or any user terminals. In such an approach, the repeaters operate totally autonomous and transparent in relation to the rest of the communication system. Such solution does therefore not involve any need for standard modifications.

Figure 2:
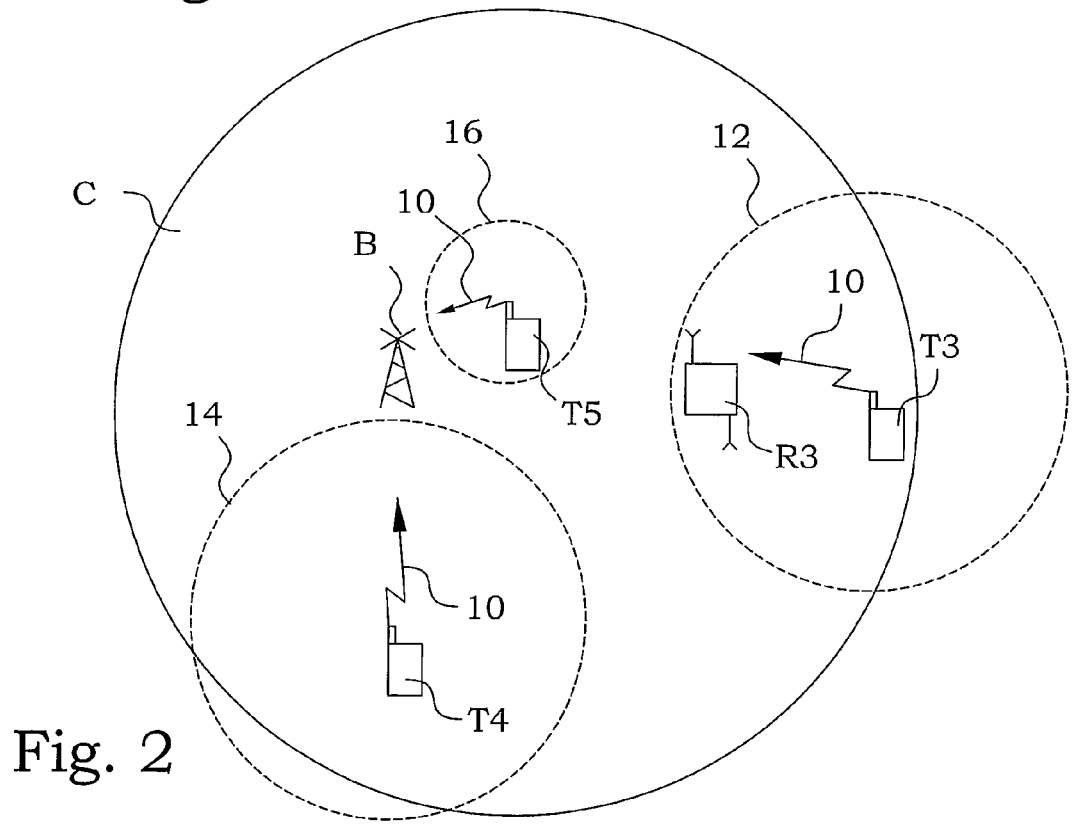
FIG. 2 is a schematic illustration of user terminals being in vicinity of a repeater.

In FIG. 2, a repeater R3 is provided within a cell C. A user terminal T3 transmits uplink signals 10 aimed for the base station B. The uplink signals 10 are also received by the repeater R3. Since the distance between the user terminal and the repeater R3 is relatively small, the received signal strength at repeater R3 is relatively high. A high received uplink signal strength indicates that a user terminal T3 is close to the repeater R3 and would probably benefit from being served by the repeater R3. In the embodiment of FIG. 2, amplification is activated in the repeater R3 as a response to an existence of an uplink radio signaling from a user terminal T3 situated in the vicinity. The determination of "being in the vicinity" is in the present embodiment implemented by using a threshold value. If the received uplink signal 10 is higher than a certain threshold value, the transmitting terminal is interpreted as being situated in the vicinity. This can be illustrated by a broken circle 12 in FIG. 2. Within such area, the received uplink signal strength is higher than the threshold and any repeater being situated inside this area is assigned to be situated in a vicinity of the transmitting user terminal T3.

Another user terminal T4 also transmits uplink signals 10 aimed for the base station B. Since the terminal T4 is situated close to the border of the cell, the signal strength is due to power regulation rather strong. However, the distance between the user terminal T4 and the repeater R3 is so large that the uplink signal becomes fairly attenuated before reaching the repeater R3, and the received signal strength falls below the threshold value. In FIG. 2, this is seen as the repeater R3 being situated outside the area 14. The user terminal T4 will therefore not trig any amplification activation in repeater R3.

A third user terminal T5 is situated at the same physical distance to the repeater R3 as the user terminal T3. However, in this case, the user terminal T5 is fairly close to the base station and due to power regulation schemes, the output signal power is low. An area 16 of "the vicinity" of user terminal T5 will therefore become very limited, and the uplink signal strength detected by the repeater falls below the threshold. The user terminal T5 will therefore not trig any amplification activation in repeater R3.

This embodiment thus proposes a method in which radio repeaters detect traffic by listening on the uplink signals. Detected uplink traffic is taken as an indication of that there is an active user terminal in the vicinity of the radio repeater and that it may be worthwhile to activate the repeater. Accordingly, a repeater that detects uplink traffic is activated and starts to amplify.

Figure 3:
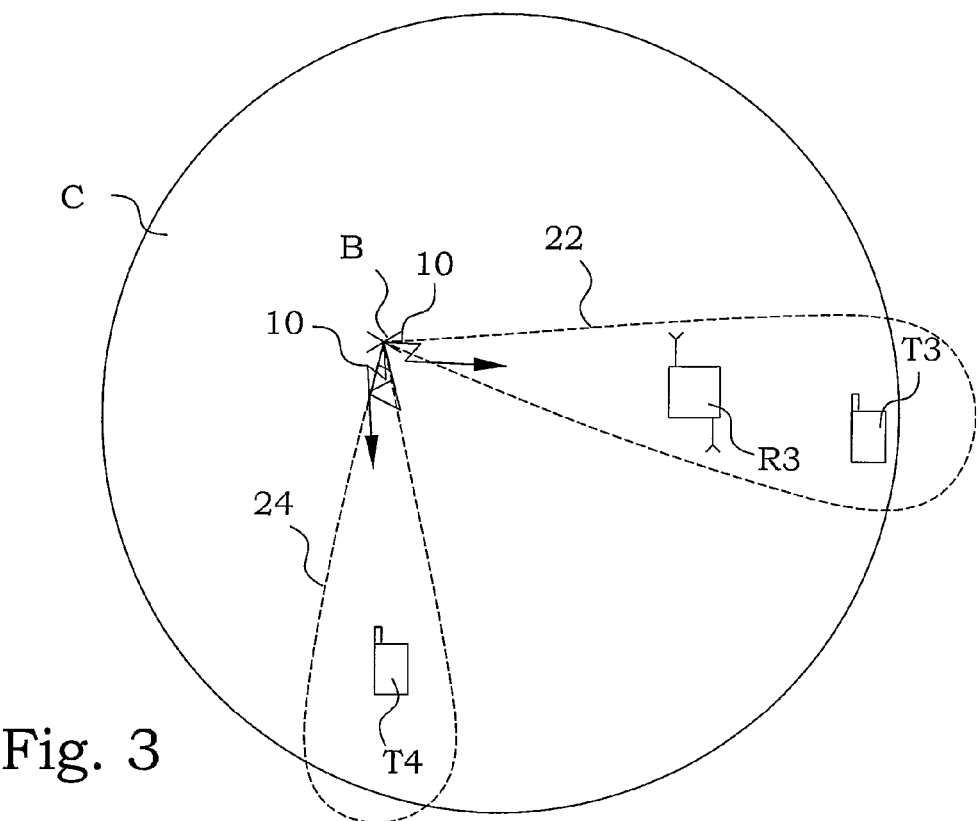
FIG. 3 is another schematic illustration of user terminals being in vicinity of a repeater.

FIG. 3 illustrates another embodiment of the present invention. In this embodiment, the base station B provides directed downlink signaling 20. A downlink signal 20 is provided in a certain angle sector 22 intended for the user terminal T3. The repeater R3 is also situated within the angle sector 22 and can therefore also detect the downlink signal 20. Since the downlink signal 20 is directed, the possibility for reception of the downlink signal in the repeater R3 implicitly means that the terminal T3 and the repeater R3 are situated in a same angle sector and with a rather high probability than also in a vicinity of each other. In the embodiment of FIG. 3, amplification is activated in the repeater R3 as a response to an existence of a downlink radio signaling to a user terminal T3 situated in the vicinity.

Figure 4:
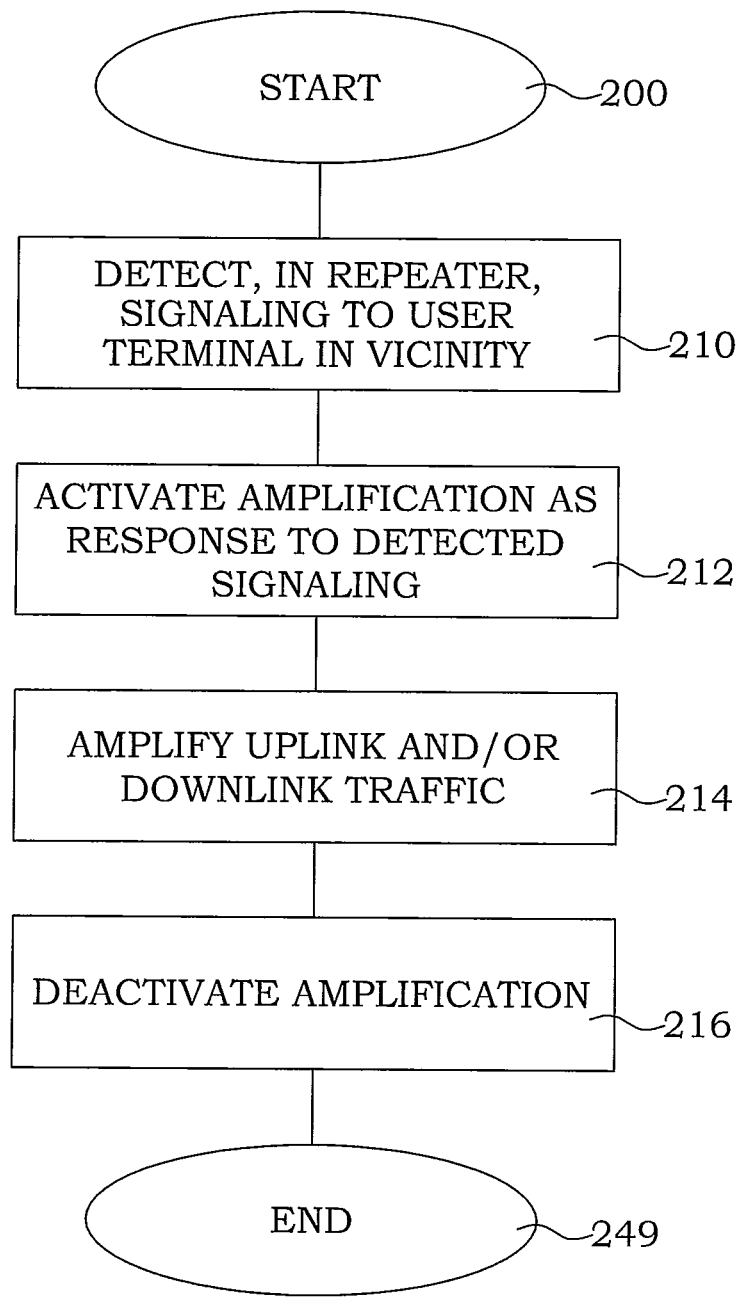
FIG. 4 is a flow diagram of steps of an embodiment of a method according to the present invention.

FIG. 4 illustrates a flow diagram of steps of an embodiment of a method according to the present invention. A method for controlling operation of a repeater in radio communication system starts in step 200. In step 210, radio signaling to and/or from a user terminal being situated in a vicinity of the repeater is detected in the repeater. As exemplified above, this can be done by identifying any uplink signaling and preferably comparing the received signal strength with a threshold, or by identifying any directed downlink signaling. Amplification in the repeater is activated in step 212 as a response to an existence of such a radio signaling. The activation of amplification in the repeater means that the repeater is made operable to perform different kinds of amplification operations.

In step 214, amplifying of uplink traffic from the user terminal and/or downlink traffic to the user terminal is performed. This step can be performed according to different alternative approaches, depending on the character of the signaling conditions. In one embodiment, either uplink or downlink signaling to the user terminal in question is extracted, amplified selectively and forwarded to the intended receiver. Such embodiment is useful in situations where the interference situation in uplink and downlink may differ considerably or in cases when the signal strength of the signals received in uplink and downlink differs significantly. The latter may happen when there is a large difference in available output power between the base station (downlink) and the user terminal (uplink). By only amplifying signaling in one direction, additional interference in the other direction may be avoided. In another embodiment, both uplink and downlink signaling to the user terminal is amplified. This may be beneficial if the signaling conditions are more equal between uplink and downlink. A need for repeater assistance in one direction then probably means that there also is a need for repeater assistance in the opposite direction. If the amplification is to be restricted only to the signaling concerning the user terminal in question, the repeater has to be provided with information about allocation principles within the communication system and the cell within it is situated, in order to be able to extract the appropriate signaling. The repeater then also has to comprise processors arranged for performing such extraction tasks. In yet another embodiment, the repeater may instead amplify all uplink and downlink signaling. In such a case, the repeater can be made simpler, but instead the interference situation may deteriorate due to unnecessary amplification. The suitable approach is preferably selected based on the signaling characteristics within the cell in question.

In the present embodiment, in step 216, the amplification is deactivated when traffic to/from the user terminal ends. This can be performed in different ways, as discussed further below. The procedure ends in step 249.

In one embodiment, the deactivation of the amplification is performed dependent on a function of a time since last detected radio signaling to and/or from the user terminal. In a simplest form, the deactivation can be performed after a predetermined turn off delay, i.e. when uplink traffic detection is employed, some time after the latest uplink traffic detection the repeater is deactivated.

Figure 5:
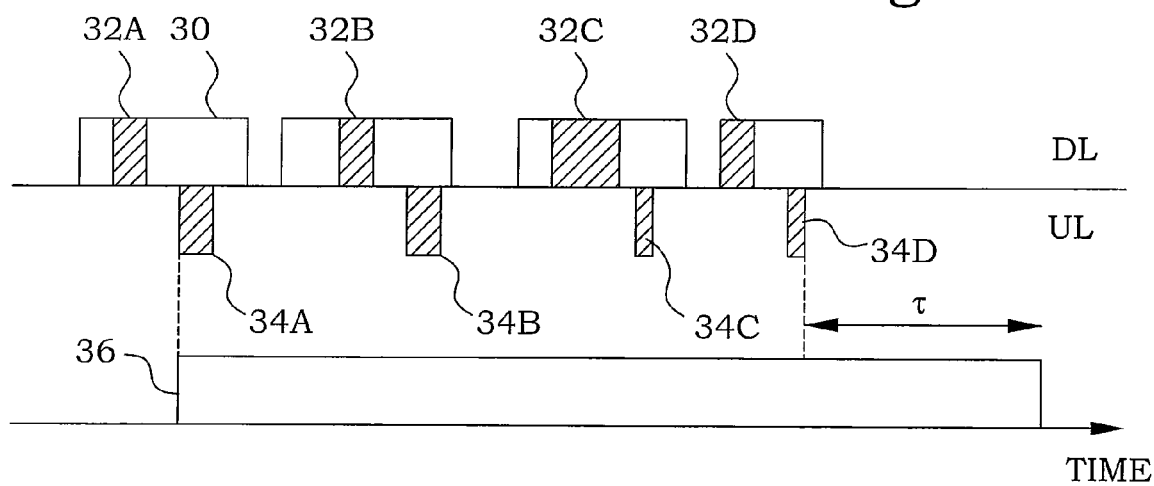
FIG. 5 illustrates a possible traffic pattern in a cell.

FIG. 5 illustrates a possible traffic pattern in the cell. The solid line 30 indicates traffic transmitted from a base station of the cell. The dashed rectangles 32A-D, 34A-D indicate data bursts, i.e. traffic between the base station and a specific user terminal, say terminal T2 in the example in FIG. 1 above. Rectangles 32A-D above the time axes indicate downlink traffic while rectangles 34A-D below the time axes indicate uplink traffic.

According to one embodiment, presented above, the radio repeaters will listen for uplink traffic and once uplink traffic of a certain strength is detected the amplification functionality of the repeaters will be activated (autonomously). Once the repeater detects uplink traffic it will start to amplify-and-forward the signals, in the present embodiment in both uplink and downlink. In this way, the uplink and downlink data rates from/to the user terminal causing the uplink traffic can be increased. One may notice that the invention relies on the fact that the traffic is bidirectional. This is also typically the case. Even when the user data flow is unidirectional, e.g. during a file download, control information like ACK/NACK messages are typically transmitted on the uplink and may then give rise to a detection.

In the example in FIG. 5, the repeater will not improve the first downlink data burst 32A transmitted to the user terminal. Once detecting the first uplink signal 34A, however, the repeater will activate its amplification functionality, as indicated by the line 36, and thereby improve the quality of the remaining uplink and downlink transmissions 32B-D, 34A-D. By means of link adaptation the improved signal quality can be utilized to increase the data rate. Alternatively, for fixed rate power controlled links, the activation of the repeater may lower the output power of the base station and the user terminal, which is beneficial especially for the battery powered user terminals.

In the present embodiment, activated repeaters are turned off some time after the latest uplink traffic 34D is detected. This deactivation time should, typically, cover at least a couple of frames. For example, if the user terminal is a voice user a data packet is transmitted and received roughly every 20 ms, the repeaters should preferably not be turned off in between consecutive packets. In FIG. 5 the turn off delay equals τ seconds.

Figure 6A:
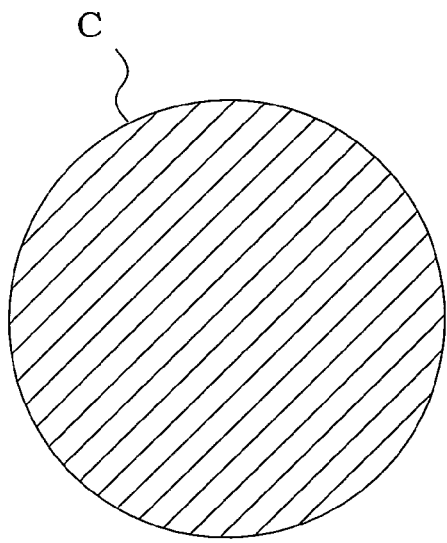
FIGS. 6A-C illustrate signal strengths in cells where different deployment techniques are used.
Figure 6B:
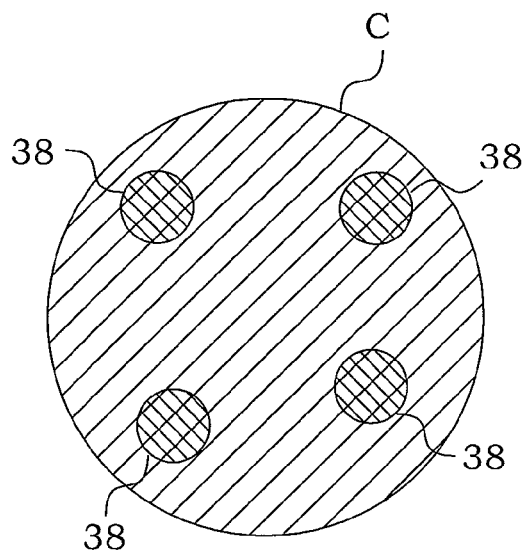
Figure 6C:
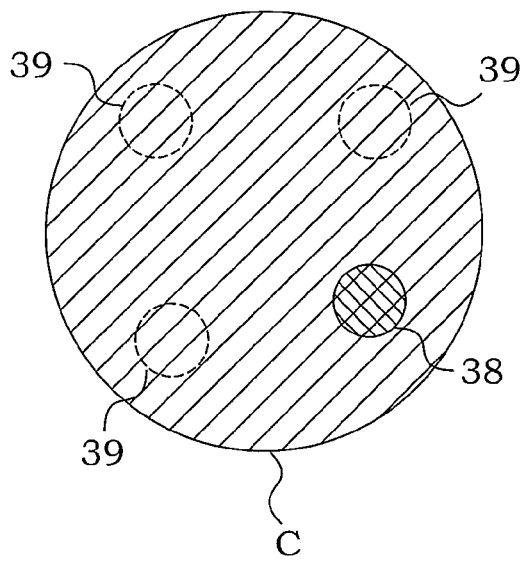

FIGS. 6A-C depict the signal strength in a cell in which three deployment techniques have been used. In the case of FIG. 6A, a base station in the middle of the cell is used to provide coverage. In the case of FIG. 6B, the cell comprises one base station and four radio repeaters. The repeaters are constantly active, giving rise to additional signal strength 38. FIG. 6C, finally, illustrates a situation in which repeaters are selectively activated triggered by the traffic. In the particular situation illustrated in FIG. 3C, one radio repeater is active giving rise to additional signal strength 38, while the others are silent (as illustrated by the broken circles 39. The invention aims at this latter case of FIG. 6C.

By means of the invention radio repeaters may autonomously determine whether to be in active or idle mode. Only if the traffic detection indicates that the repeater may improve the ongoing transmissions it is activated. Once the traffic detection indicates that the repeater is no longer needed it is deactivated.

The method provides means for introducing radio repeater in a cellular system without causing unnecessary interference in the network. The proposed method further reduces the power consumption of the radio repeaters. Its application is suited e.g. for packet data networks in which connections can take advantage of high instantaneous data rates during relatively short session times. Also, for power controlled links the method can reduce the output power.

Figure 7:
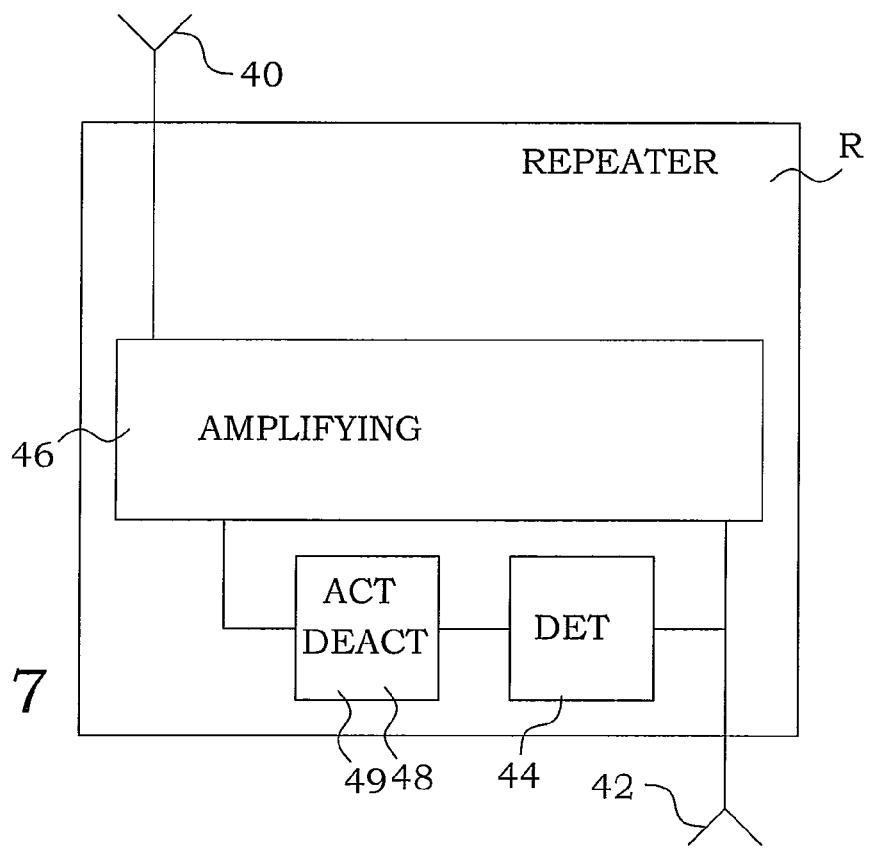
FIG. 7 is a block diagram of an embodiment of a repeater device according to the present invention.

FIG. 7 illustrates a block diagram of an embodiment of a repeater device R according to the present invention. The repeater device R is arranged for use in a radio communication system. The repeater device R comprises a first antenna 40 and a second antenna 42. In the present embodiment, the first antenna 40 is arranged for receiving downlink radio signals from a base station and for transmitting uplink radio signals to the base station. Also in the present embodiment, the second antenna 42 is analogously arranged for receiving uplink radio signals from user terminals and for transmitting downlink radio signals to the user terminals.

The repeater device R further comprises an amplifier arrangement 46. In the present embodiment, the amplifier arrangement 46 is arranged for amplifying both uplink and downlink traffic and is therefore connected to both the first antenna 40 and the second antenna 42. In other words, the amplifier arrangement 46 is arranged to amplify uplink traffic from a user terminal and downlink traffic to the user terminal. The amplifier arrangement 46 operates basically according to any repeater amplifying scheme known as such from prior art. In the present embodiment, the amplifier arrangement 46 assists in amplifying both uplink and downlink signals, which means that arrangements have to be provided for switching between the different directions. If uplink and downlink traffic is present simultaneously, which may be the case in FDD systems, the device may instead comprise two amplifiers. The first amplifier is then used to amplify uplink traffic while the second is used to amplify downlink traffic. Examples of such amplifier arrangements, which would be possible to use together with the present invention can be found e.g. in US 2004/0146013 or US 2007/0015462.

As mentioned above, the amplifier arrangement 46 can be arranged in different ways. In one embodiment, only uplink signals may be amplified, in another only downlink traffic and in a further one both uplink and downlink traffic. Similarly, in one embodiment, only traffic being associated with the user terminal in question is amplified, while in other embodiments, all traffic is considered.

The repeater device R comprises a detector 44, connected to the second antenna 42. The detector 44 is in this embodiment arranged for detecting any existence of radio signaling from a user terminal being situated in a vicinity of the repeater R. To that end, the detector 44 determines a signal strength of the uplink radio signals received by the second antenna 42. If the signal strength exceeds a threshold value, it can be concluded that a user terminal that probably would benefit from assistance of a repeater is situated in the vicinity of the repeater R.

The repeater device R further comprises means for activating 48 the amplifier arrangement 46. The means for activating 48 is connected to the detector 44 and is arranged for activating the amplifier arrangement 46 as a response to an existence of any radio signaling detected in the detector 44 exceeding the threshold value. The means for activating 48 thus controls the operation of the amplifier arrangement 46, in that sense that the amplifier arrangement 46 is not allowed operating if not having an approval from the means for activating 48.

The repeater device R also comprises a means for deactivating 49 the amplifier arrangement when traffic with the user terminal ends. In the present embodiment, it is integrated in the same section as the means for activating 48. The means for deactivating 49 keeps track on the traffic to or from the user terminal in question and when the traffic ends, the operation of the amplifier arrangement 46 is stopped. As discussed above, a simple arrangement is to apply a certain delay time after a last radio signal to and/or from the user terminal. In such a case, the means for deactivating 49 simply comprises a time-out clock, which is reset at each received radio signal to and/or from the user terminal. When the traffic ends, the amplifier arrangement 46 will be turned off with a certain delay.

In another embodiment, the means for deactivating 49 may comprise more sophisticated functionality, e.g. for registering a signaling history. Received radio signals can e.g. be connected to a filter, where different characteristics, such as duration, average received power over time, or degree of bursts can be allowed to influence an output of the filter, which can be related to the delay time used for deactivation. In other words, the function determining the delay time can be made dependent on a signaling history to and/or from the user terminal. For instance, a session of radio traffic to and from a user terminal that has continued for a relatively long time may influence the delay time to be longer than for a short radio traffic session. Such an arrangement can provide for assisting long duration sessions having short periods of inactivity, without having to change the activity level of the amplification operation. Similarly, a radio traffic session that has a high mean transmitted data rate may be more likely to continue also after a short break. In the case of traffic having a high degree of burstiness, i.e. that the data transmission rate varies considerably over time, periods of inactivity are more likely to occur compared to sessions where a steady data rate is used. By arranging the filter to take such considerations into account, a varying delay time can be used for determining when the means for deactivating 49 will instruct the amplifier arrangement 46 to be turned off. The particular configuration of the filter can advantageously be adapted to the type of traffic that is present in the communication system.

Amplifier arrangements in repeaters are typically rather fast to activate. When an uplink radio signal of sufficient strength is detected, the time for starting the amplifier is typically short enough to allow also an amplification of the very same uplink signal that is detected. However, in more sophisticated amplifier arrangements, the starting-up time may sometimes be longer. In such cases, there might be different levels of stand-by conditions. For instance, the amplifier arrangement may be fully powered but not being actively amplifying any signals. The start-up time from such a condition may be shorter than starting from a fully unpowered condition. In such an arrangement, the means for deactivating 49 could be arranged for controlling the deactivation stepwise. For instance, after a first delay time, the actual amplification of the amplifier arrangement can be stopped, but still keeping the amplifier arrangement fully powered until a further delay time has expired. In such cases, the start-up time of the amplifier arrangement may be shortened if a new traffic session is detected while the amplifier arrangement still is powered. De-activation by two or more stages can therefore with advantage be applied together with the present invention.

In an alternative embodiment, the repeater device R of FIG. 7 could be arranged for detecting downlink radio traffic to a user terminal being located in the vicinity of the repeater device. As mentioned above, this is achievable in case of directed radio signals, since it can be concluded that the user terminal has to be present within the same restricted coverage area of such directed signaling. In such an embodiment, the second antenna 42 is arranged for receiving downlink radio signals from a base station and for transmitting uplink radio signals to the base station. Also, the first antenna 40 is analogously arranged for receiving uplink radio signals from user terminals and for transmitting downlink radio signals to the user terminals.

Figure 8:
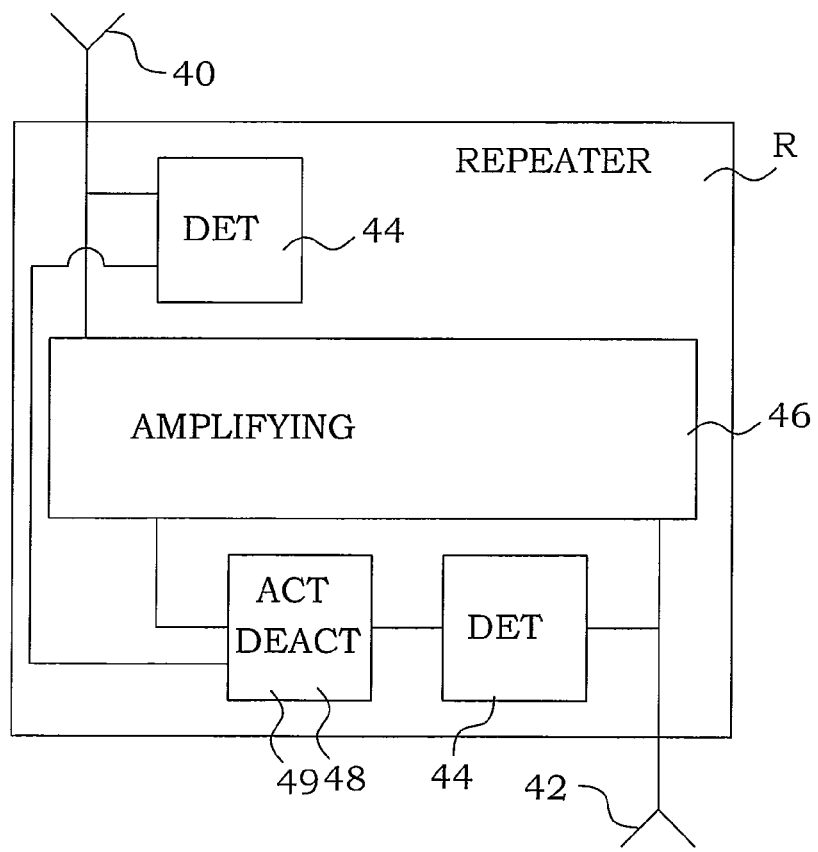
FIG. 8 is a block diagram of another embodiment of a repeater device according to the present invention.

These two approaches could also be combined, as illustrated in FIG. 8. Here, two detectors 44 are present, monitoring one signaling direction each, and any of the detectors 44 may inform the means for activating 48 that a relevant radio signal has been received.

The means for deactivation 49 may in a particular embodiment also be assisted by the communication network itself. In such an embodiment, the use of repeaters will not be totally transparent, since some type of standard modification is requested. Even if the communication network basically is unaware of whether there are any repeaters present within the different cells and if that is the case whether they are active or not, de-activation may be supported by the base station. At the end of every traffic session, or at least for such traffic where use of a repeater may be suspected, the base station can include a control message aimed for any possible active repeater. Such a control message denotes the end of the traffic session and may be used by the means for deactivation 49 to find a suitable time for deactivating the amplifier arrangement. The repeater device comprises in such an embodiment a control signal receiver, possibly integrated with one of the other receivers. The control signal receiver is arranged for extracting information from the control signaling from the base station of the cell or from the user terminal and connected to the means for deactivating. The means for deactivating is subsequently arranged for deactivating the amplifier arrangement as a response to information obtained from control signaling. However, such a solution requires a change of existing signaling standards.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

US 2004/0146013
US 2006/0166618
US 2007/0015462

The invention claimed is:

1. A method for controlling the operation of a repeater in a radio communication system, said method comprising:
    detecting, in said repeater, radio signaling to or from a user terminal situated in a vicinity of said repeater, wherein said repeater is configured to amplify and forward said radio signaling without decoding said radio signaling;
    activating amplification in said repeater in response to said detecting of said radio signaling;
    amplifying at least one of uplink traffic from said user terminal and downlink traffic to said user terminal; and
    deactivating said amplification when traffic to said user terminal ends, wherein said deactivating is performed dependent on a function of a time since the last detected radio signaling to or from said user terminal, and wherein said function is dependent on a signaling history to or from said user terminal.

2. The method of claim 1, wherein said detecting said radio signaling comprises detecting uplink radio signaling from said user terminal having a received signal strength exceeding a predetermined threshold.

3. The method of claim 1, wherein said detecting said radio signaling comprises detecting directed downlink radio signaling to said user terminal.

4. The method of claim 1, wherein said amplifying comprises amplification of at least one of all uplink and all downlink traffic.

5. The method of claim 1, wherein said amplifying comprises amplification of at least one of uplink and downlink traffic only from and to said user terminal.

6. The method of claim 1, wherein said deactivating is performed by stages.

7. The method of claim 1, wherein said deactivating is performed as a response to control signaling from a base station of said radio communication system, or from said user terminal.

8. A repeater device for use in a radio communication system, said repeater device comprising:
a detector configured to detect radio signaling to or from a user terminal that is situated in a vicinity of said repeater device, wherein said repeater device is configured to amplify and forward said radio signaling without decoding said radio signaling;
an amplifier arrangement configured to amplify at least one of uplink and downlink traffic; and
a controller configured to:
activate said amplifier arrangement, wherein said controller is connected to said detector and arranged for activating said amplifier arrangement in response to said detector detecting said radio signaling;
deactivate said amplifier arrangement when traffic to said user terminal ends dependent on a function of a time since the last detected radio signaling to or from said user terminal; and
register a signaling history to or from said user terminal, and wherein said controller is correspondingly configured to deactivate said amplifier arrangement in dependence on said signaling history; and
whereby said amplifier arrangement is arranged to amplify at least one of uplink traffic from said user terminal and downlink traffic to said user terminal.

9. The repeater device of claim 8, wherein said detector is arranged for detecting uplink radio signaling from said user terminal and for determining whether a received signal strength of said detected uplink radio signaling exceeds a predetermined threshold.

10. The repeater device of claim 8, wherein said detector is arranged for detecting directed downlink radio signaling to said user terminal.

11. The repeater device of claim 8, wherein said amplifier arrangement is arranged for amplification of at least one of all uplink and all downlink traffic.

12. The repeater device of claim 8, wherein said amplifier arrangement is arranged for amplification of at least one of uplink and downlink traffic only from and to said user terminal.

13. The repeater device of claim 8, wherein said controller is configured to perform said deactivation by stages.

14. The repeater device of claim 8, further comprising a control signal receiver arranged for extracting information from control signaling from a base station of said cell, or from said user terminal, said control signal receiver connected to said controller, and wherein said controller is configured to deactivate said amplifier arrangement in response to information obtained from control signaling.

\* \* \* \* \*